Patented Apr. 14, 1942

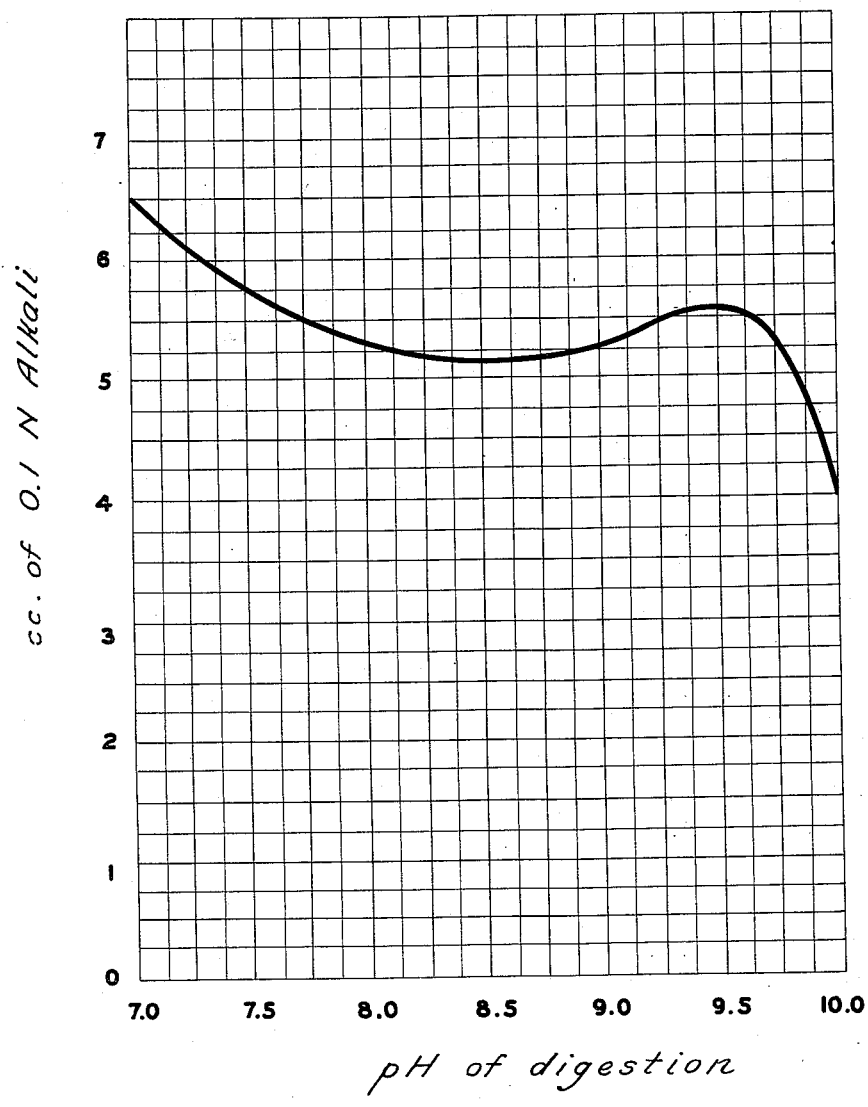

2,279,910

UNITED STATES PATENT OFFICE 2,279,910

PROTEIN DIGESTION

Gilbert B. Ayres, Stamford, and Joseph George Niedercorn, Riverside, Conn., assignors to American Cyanamid Company, New York, N. Y., a corporation of Maine Original application June 16, 1939, Serial No. 279,472. Divided and this application November 9, 1939, Serial No. 303,556

4 Claims. (Cl. 195—6)

The invention relates to the controlled digestion of protein materials and more particularly to the bating of hides and skins by subjecting them to the action of tryptic enzymes of *Penicillium brevicaule*, otherwise known as *Scopulariopsis brevicaulis*.

It has been discovered that *Penicillium brevicaule* produces enzymes which have sufficient proteolytic activity under neutral, acid, and alkaline conditions to render them commercially attractive in the bating of hides and in similar processes involving the selective digestion of proteins.

It is an object of the present invention to provide these enzymes in the form of a dried proteolytic culture which is suitable for use as a bate. It is a further object to provide a method for the bating of hides and skins using these enzymes as bates, preferably in conjunction with a deliming agent such as ammonium sulfate.

The invention includes both the production of these enzymes from *Penicillium brevicaule* by inoculation of a suiable nutrient medium and cultivation of the inoculated medium and the provision of the enzymate (enzyme+carrier) in dried form, and also the selective digestion of proteins and the bating of hides and skins by subjecting the materials to the action of these proteolytic enzymes.

As illustrative of the proteolytic activity in alkaline solution of these enzymes produced by *Penicillium brevicaule* there is shown in the single figure of the accompanying drawing a curve, the ordinates of which are given in terms of standard alkali and the abscissae in terms of pH values. The curve was constructed from values obtained in digesting a casein substrate (sodium caseinate) with a culture of these enzymes at increasing alkalinities of the sodium caseinate solution. The undigested casein was precipitated with a standardized solution of sulfuric acid and sodium sulfate and the filtrate therefrom, containing the digested casein, titrated with 0.1 N-alkali. The tests were conducted by a modification of the procedure of Volhard and Loehlein for the determination of proteolytic activity of enzymes described in "Praktikum der Physiologischen Chemie," Part 1, pages 258–259, by Peter Rona, 2d ed., Julius Springer, Berlin, 1931. The curve which was plotted for a pH range of 7–10, after sloping off from the point of neutrality, changes sign and ascends until a pH of about 9.5 is reached whereupon it again changes sign and slopes downwardly to the pH of 10. By inspection it will be seen from this curve that the enzymes of the present invention manifest a uniformly good rate of activity in alkalies at least up to the point where the alkalinity reaches a pH value of about 9.5.

The preparation of these enzymes is as follows: A suitable nutrient medium in the granular or solid discrete particle condition, such as bran, moistened with an equal weight of water, is inoculated with a culture of *Penicillium brevicaule* and the inoculated moist bran spread out in thin layers on trays. The inoculated bran is then incubated in an oven maintained at a temperature of about 30° C. and preferably at not higher than this temperature, and at a humidity in the oven such that the atmosphere therein is saturated but does not contain sufficient moisture to cause deposition of the same onto the bran. The inoculated bran is maintained in the oven until sporulation occurs. After incubation for the optimum period the bran culture may be thoroughly mixed with 0.2% of cresylic acid in solution, if desired, to improve the wetting out of the bran when used in solution. The culture or enzymate is then dried at a temperature below 45° C., e. g., 40° C., and may be used as such for bating, or an ammonium salt, e. g., ammonium sulfate, may be incorporated with the moist mass and the mixture then dried. The bran used for the culture may or may not be sterilized before the inoculation and likewise the culture may or may not be sterilized, although sterilization of the culture or enzymate does not appear necessary at the present time.

The enzyme may be liberated from the dried culture by elution with dilute solutions of various salts, such as ammonium chloride, ammonium sulfate, sodium chloride, sodium sulfate, etc. and the eluted enzymes used in other fields as digestants.

The proteolytic enzymes may be applied to the bating of hides and skins in the form of an enzymate in any manner now practiced in the art for the application of other tryptic bates. One method now in use involves washing the hides from the dehairing step, and adding an ammonium salt, such as ammonium sulfate, to the water containing the hides in order to lower their pH which is generally very high due to the strongly alkaline conditions under which dehairing takes place. Before adding the ammonium salt the hides may be treated for removing lime blast by the addition of a suitable acid, such as hydrochloric acid, to the water bath containing the hides. After the pH of the bath has been suitably adjusted, the enzyme bate is added thereto in an amount determined by the enzyme unit strength of the bate, the kind of hide or skin to be bated, the extent of bating desired, the length of the bating time and the temperature of the bating bath.

For the purpose of illustration, there is described in the following example a method for bating of hides with the enzymes of *Penicillium brevicaule*.

Example

Wash a 500 lb. pack of limed kips from the dehairing bath with water for 15 minutes at 70° F. Heat the washed pack in water to 95° F. and add 5 lb. of hydrochloric acid thereto, the bath showing red to methyl orange. After three minutes add lime to the bath until it is slightly pink to phenolphthalein. To the bath then add 3½ lb. of ammonium sulfate and about 1% (based on the weight of the kips) of enzymate prepared as described above. Run the paddle for the desired length of bating time with a final temperature therein of 85° F. After the kips have been bated cool them to 70° F.

While the application of these enzymes has been described with particular reference to the bating of hides and skins their utility is not limited to this field. On the contrary they may be used in many other processes in which a tryptic enzyme of high activity is desired, such as in desizing and degumming textiles, paper sizing, tenderizing of meat, stripping of gelatin from photographic films and plates, manufacture of peptones, chewing gum, glue, foods, drugs and biological products or in any field where by their use a protein or a protein degradation product can be reduced to a lower molecular size of increased solubility.

It will be understood that the above description is intended as illustrative and not as limiting of the invention, the scope of which is defined by the following claims.

This is a division of our copending application Serial No. 279,472, filed June 16, 1939.

What we claim is:

1. A process of bating hides which comprises subjecting them to the action of enzymes present in a dried culture of the mold *Penicillium brevicaule*, said enzymes being characterized by a uniformly high rate of proteolytic activity under alkaline conditions within a pH range up to about 9.5.

2. A process of bating hides under alkaline conditions within a pH range up to about 9.5 which comprises subjecting them to the action of enzymes of *Penicillium brevicaule* in a dried culture of the mold, said enzymes being characterized by a uniformly high rate of proteolytic activity under alkaline conditions within a pH range up to about 9.5.

3. A process of bating hides which comprises subjecting them to the action of enzymes of *Penicillium brevicaule* in a dried culture of the mold, said enzymes being characterized by a uniformly high rate of proteolytic activity under alkaline conditions within a pH range up to about 9.5, and in the presence of an ammonium salt.

4. A process of bating hides which comprises subjecting them to the action of enzymes of *Penicillium brevicaule* in a dried culture of the mold, said enzymes being characterized by a uniformly high rate of proteolytic activity under alkaline conditions within a pH range up to about 9.5, and in the presence of ammonium sulfate.

GILBERT B. AYRES.
JOSEPH G. NIEDERCORN.